No. 779,125. PATENTED JAN. 3, 1905.
H. KLEIN.
KITCHEN CABINET.
APPLICATION FILED MAR. 27, 1901. RENEWED JUNE 11, 1904.
2 SHEETS—SHEET 1.
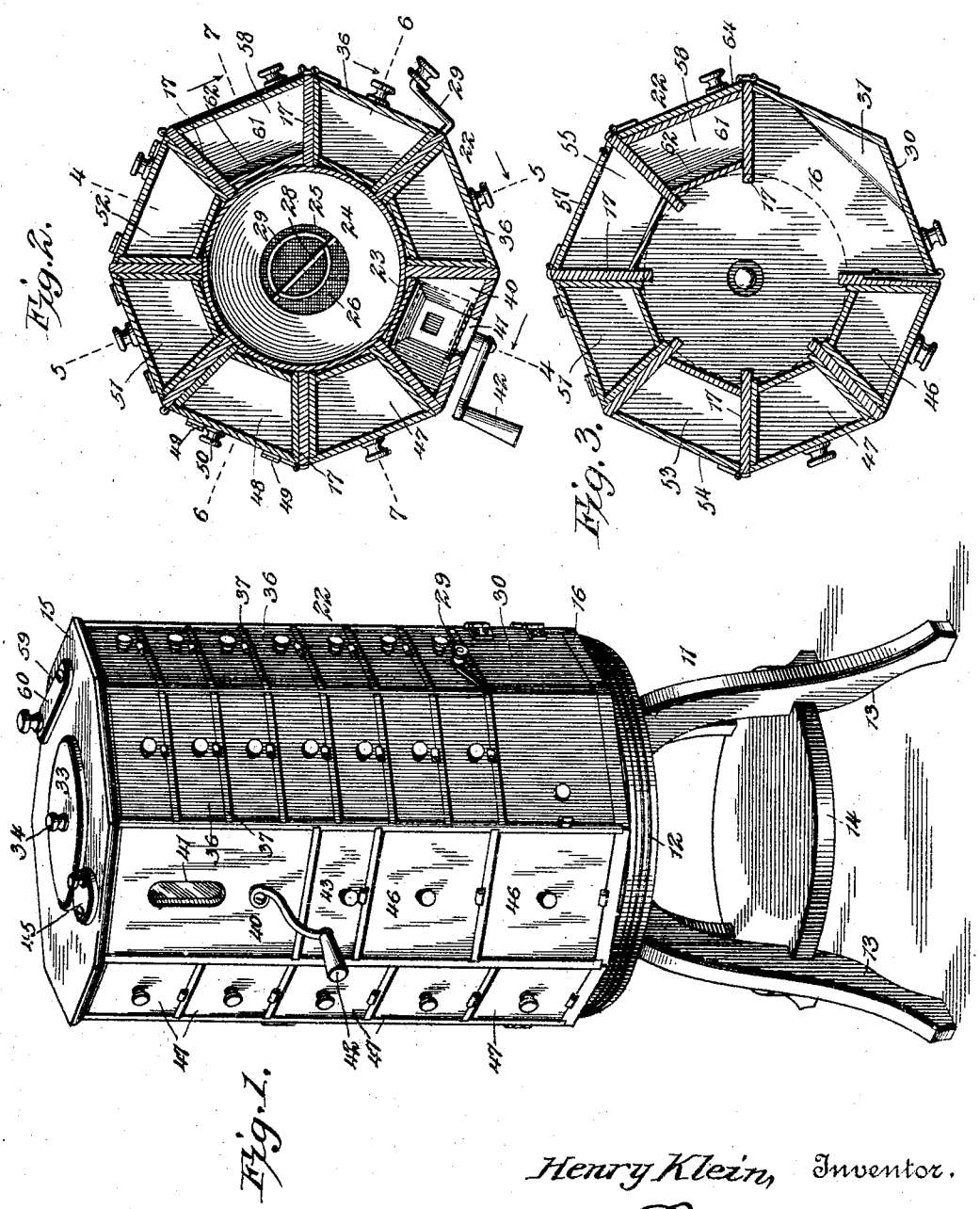
Henry Klein, Inventor.
Witnesses

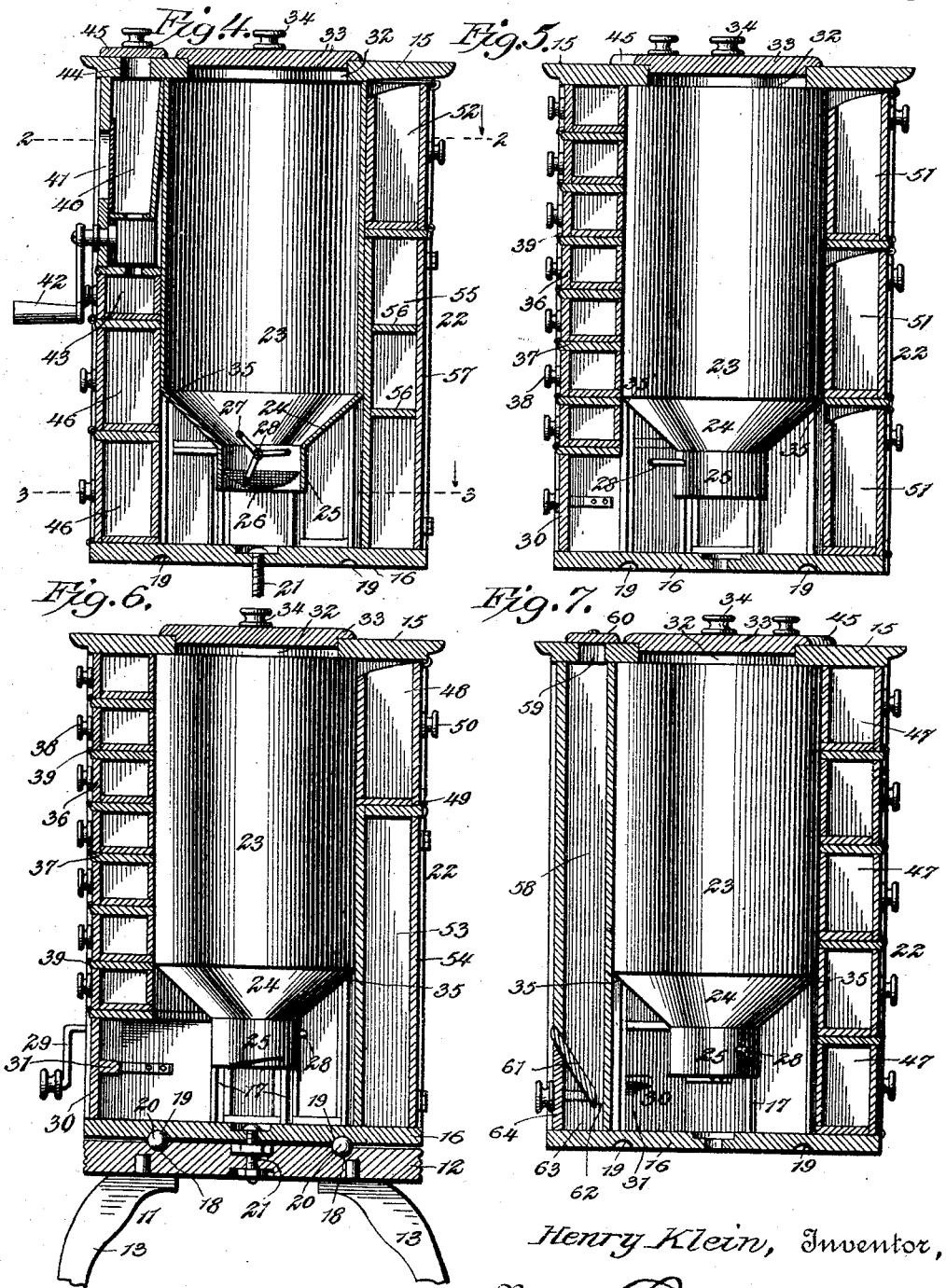

No. 779,125. Patented January 3, 1905.

UNITED STATES PATENT OFFICE.

HENRY KLEIN, OF CARDINGTON, OHIO.

KITCHEN-CABINET.

SPECIFICATION forming part of Letters Patent No. 779,125, dated January 3, 1905.

Application filed March 27, 1901. Renewed June 11, 1904. Serial No. 212,167.

*To all whom it may concern:*

Be it known that I, HENRY KLEIN, a citizen of the United States, residing at Cardington, in the county of Morrow and State of Ohio, have invented a new and useful Kitchen-Cabinet, of which the following is a specification.

This invention relates to kitchen-cabinets; and the object in view is to provide, in connection with a supporting-stand, a rotatable cabinet-body mounted upon said stand and comprising, in connection with the outer casing, an inner casing constituting a flour-bin, the outer and inner casings being adapted to receive between them a series or several series of receptacles adapted to contain articles requisite in a kitchen, the said receptacles being arranged for convenient access and adapted to protect the contents from dust, vermin, and loss of flavor or strength by exposure.

The inner wall or casing constitutes a flour-bin, and the bottom thereof is contracted in size and arranged above the bottom of the cabinet-body to receive a suitable receptacle, which may be introduced beneath the contracted lower end of the flour-bin for the purpose of catching the flour as it is passed through the perforated or screen bottom of the bin, in connection with which a flour agitator or sifter is employed. The outer casing is provided with a door-covered opening through which the said receptacle for the flour may be introduced.

With the above and other objects in view, the nature of which will appear more fully as the description proceeds, the invention consists in the novel construction, combination, and arrangement of parts, as will be hereinafter fully described, illustrated, and claimed.

In the accompanying drawings, Figure 1 is a perspective view of a rotatable kitchen-cabinet complete constructed in accordance with the present invention. Fig. 2 is a transverse horizontal section taken on the line 2 2 of Fig. 4. Fig. 3 is a similar section taken on the line 3 3 of Fig. 4. Fig. 4 is a vertical central section taken on the line 4 4 of Fig. 2. Fig. 5 is a similar section taken on the line 5 5 of Fig. 2. Fig. 6 is a similar section taken on the line 6 6 of Fig. 2. Fig. 7 is another central vertical section taken on the line 7 7 of Fig. 2.

Similar numerals of reference designate corresponding parts in all the figures of the drawings.

In carrying out the present invention I employ a suitable supporting-stand 11, which comprises, essentially, a series of supporting-legs 13, rigidly connected at points intermediate their ends by means of a brace 14, which may constitute an auxiliary shelf, the same being preferably in the form of a disk which is notched or mortised to receive the legs.

The cabinet-body comprises, essentially, a horizontal supporting base or disk 12, having sockets to receive dowel-pins at the upper extremities of the legs 13, whereby the base may be disconnected from the legs, so as to allow the cabinet to rest upon a table or similar support. The cabinet-body also comprises a top 15 and a bottom 16, the said top and bottom being connected by vertical division-strips 17, which are disposed radially with respect to the axial center of the cabinet-body and which form between them a series of compartments or spaces in which the several receptacles hereinafter more particularly referred to are received. It will here be noted that the compartments are substantially trapezoidal in cross-sectional shape. By preference the top and bottom 15 and 16, respectively, are scored or grooved to receive the upper and lower extremities of the division-strips 17, which are inserted and glued or otherwise held therein, thus forming a strong and durable structure.

In order to provide for the easy rotation of the upper portion of the cabinet or cabinet-body with respect to the stationary supporting-stand 11, the top 12 of the stand and the bottom 16 of the cabinet-body are provided in their adjacent faces with oppositely-located circular grooves or ball-races 18 and 19, respectively, and in said grooves are arranged a circular series of antifrictional balls 20, which enable the cabinet-body to be rotated upon its axis of movement with a minimum amount of friction, the cabinet-body being adjustably connected to the base by means of a bolt 21, with nuts above and beneath the base 12.

It will here be observed that the pivot-bolt 21 is designed to prevent lateral displacement of the cabinet-body and when adjusted in either direction is maintained rigid by the nuts, so as to prevent wabbling of the body. Moreover, the nuts are seated in recesses in the top and bottom of the support, whereby the nuts are housed and protected against accidental turning. This is particularly true of the upper nut, which by being seated in the recess lies flush with or below the top of the support, and thereby out of possible contact with the bottom of the rotatable cabinet, as the latter is supported out of contact with the support by the antifriction-balls 20.

The cabinet-body comprises, in addition to the top, bottom, and division-strips, outer and inner walls or casings. The outer wall 22 is preferably polygonal, being shown in the form of an octagon, although it will be apparent that the outer casing may be provided with any number of flat sides or, in fact, may be cylindrical. The outer casing 22 is composed for the most part of the outer sides or the fronts of the series of drawers, doors, closets, and other compartments hereinafter more particularly described, while the inner wall or casing 23 is cylindrical and constitutes a flour-bin. This flour-bin is preferably formed of metal and terminates at its upper end in line with the top 15 of the cabinet-body, while the lower end of said bin is contracted in size to form a conical portion 24 and a reduced discharge-mouth 25, in which is arranged a concavo-convex flour screen or sieve 26, in connection with which operates a flour-agitator or sifting device 27, which is mounted upon a shaft 28, journaled in the reduced mouth 25 of the flour-bin and also passing through the outer wall of the cabinet-body, where it is provided with an operating crank-handle 29, the said crank-handle when in its proper position being arranged above a hinged and horizontally-swinging door 30, composed of sections of two of the flat sides of the polygonal outer case connected by means of angle-braces 31, as clearly shown in Fig. 3. The lower edge of the discharge-mouth 25 is arranged sufficiently above the bottom or floor 16 of the cabinet-body to admit of the introduction thereunder of a suitable receptacle or pan in which to receive the flour as it is sifted, the said receptacle or pan being adapted to be introduced through the opening covered by the door 30 preparatory to the operation of the sifter. The top 15 of the cabinet-body is provided with a centrally-arranged opening 32, covered by means of a lid 33, having a suitable lifting handle or knob 34, whereby the flour may be readily introduced into the bin.

In order to form a sufficient support for the cylindrical flour-bin, the inner edges of the division-strips or partitions 17 are cut away throughout their upper portions, and in this way inclined shoulders 35 are provided, upon which the conical portion of the flour-bin rests, as illustrated in the several vertical sectional views.

Above the door 30 are arranged two vertical series of slide-drawers 36, separated from each other by intervening horizontal partitions 37 and provided with drawer pulls or knobs 38 and also having coöperating therewith a series of latches 39, each of which is constructed of a strip of spring metal arranged between the bottom of the drawer and the supporting horizontal partition therefor, the said spring-strip being secured to the partition and having its outer end recurved or rolled to form a shoulder which allows the drawer to be pushed inward and then snaps upward in front of the drawer, so as to prevent the accidental escape thereof.

At another side of the cabinet is arranged a coffee-receptacle 40, having a glass-covered observation-opening 41, said receptacle having arranged in the bottom thereof a coffee-grinding mill of any suitable construction which is capable of being operated by an exteriorly-arranged crank-handle 42, the coffee when ground falling into the drawer 43, which is arranged beneath the coffee-partition and is similar to the drawers 36, just hereinabove described. The supply of coffee is introduced into the receptacle or compartment 40 through a door-covered opening 44 in the top of the cabinet-body, 45 designating the door or lid for closing the said opening 44. Beneath the drawer 43 are arranged other drawers 46 of larger size and adapted to contain such articles as oatmeal, Graham flour, buckwheat, and the like, the smaller drawers hereinabove referred to being adapted to contain such articles as pepper, mustard, ginger, allspice, cloves, &c. The side adjacent to that containing the coffee-compartment 40 comprises a vertical series of drawers 47, similar to those, 46, just referred to, and the next side of the cabinet comprises a vertically-tilting bin 48, open at the top and hinged at the bottom and adjacent to its outer edge, as shown at 49, the said bin being provided with an operating-knob 50, whereby the bin may be rocked open to a horizontal position or so as to incline downwardly for discharging any desired portion of the contents thereof into a suitable receptacle. The adjoining side of the cabinet is composed of a series of tilting and vertically-swinging bins 51, similar to that, 48, just referred to. The adjoining side of the cabinet comprises another tilting bin, 52, similar to those, 48 and 51, just described. Beneath the bin 48 is arranged a closet 53 for containing culinary articles, which closet is covered by a horizontally-swinging hinged door 54. Beneath the tilting bin 52 is another closet, 55, which is preferably equipped with shelves 56, the front of the closet being closed by a hinged and horizontally-swinging door 57. The remaining side of the cabinet comprises a vertical compartment 58 for the reception of such material as cornmeal, the meal being introduced through an opening 59 in the top of the cabinet, which opening is normally closed by means of a slide or cover 60. The bottom of the compartment 50 terminates in an inclined deflector 61, which leaves a contracted discharge-throat 62, leading to an underlying compartment 63, which is normally closed by means of a hinged and horizontally-swinging door 64, through which the contents may be removed. The inclined deflector 61 to a certain extent shuts off the flow of the cornmeal or other material and allows the same to feed down into the compartment 63 as needed.

From the foregoing description it will be seen that I have produced a simple combination and handy kitchen-cabinet adapted to contain all kinds of articles which are required in every-day use in culinary departments and that the same articles are contained in such compartments to which ready access may be had. The flour-bin constitutes the largest compartment in the cabinet, and by arranging the same centrally of the cabinet the weight of the column of flour is placed in a position where it will not have a tendency to throw a greater burden on one side of the cabinet than on the other. This adds to the easy rotation of the cabinet. The construction and arrangement described also renders it unnecessary to frequently handle the flour. When a certain quantity of sifted flour is desired, a suitable pan or receptacle may be inserted beneath the flour-sifter, after which the operating-handle of the sifting device is turned until the requisite amount of flour is deposited in such pan or receptacle, which may then be removed from the cabinet. The cabinet is simple and durable in construction, and the several receptacles are arranged in compact shape, and the contents thereof are quickly and easily accessible. All of the tilting bins, drawers, closets, and other receptacles and compartments are closed in such manner as to keep the articles contained therein free from dust, vermin, or loss of flavor or strength due to exposure.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described the invention, what I claim is—

1. A dispensing-cabinet comprising a central substantially cylindrical bin forming the inner wall of the cabinet and having a filling-opening at the top, and a bottom exit-opening, vertical division-strips spaced apart and disposed along and around the outer side of the bin, drawers, doors and receptacles fitting between the division-strips and forming in conjunction therewith the outer wall of the cabinet, all of said drawers, doors, &c., being radially disposed and opening outwardly through the outer side of the cabinet.

2. A dispensing-cabinet, comprising a top, a bottom, a central substantially cylindrical bin forming the inner wall of the cabinet and terminated short of the bottom and provided with a lower exit-opening, the top and bottom being projected radially outward in all directions beyond the bin, and the top having a filling-opening communicating with the bin, vertical division-strips spaced apart and disposed along and around the outer side of the bin and extending from the top to the bottom of the cabinet and from the central bin to the outer edges of said top and bottom, drawers, doors and receptacles fitting between the division-strips and forming in conjunction therewith the outer wall of the cabinet, all of said doors, drawers, &c., being radially disposed and opening outwardly through the outer side of the cabinet, the outer wall having a bottom opening communicating with the exit-opening of the bin, and a door closing said opening.

3. A dispensing-cabinet, comprising a top, a bottom, a substantially cylindrical bin located centrally between the top and bottom with its lower end terminated short of the bottom and provided with an exit-opening, the top having a filling-opening communicating with the bin, vertical radial division-strips spaced apart and fitted snugly between and within the limits of the top and bottom and against the outer side of the bin, the lower inner edges of the strips being extended inwardly with the upper edges of the extensions fitted against the bottom of the bin to form a support therefor, doors, drawers and receptacles fitted between the strips and constituting therewith the outer wall of the cabinet, all of said doors, drawers, &c., being radially disposed and opening outwardly through the outer side of the cabinet, the outer wall having a bottom opening communicating with the exit-opening of the bin, and a door closing said opening.

In testimony that I claim the foregoing as my own I have hereto affixed my signature in the presence of two witnesses.

HENRY KLEIN.

Witnesses:
W. B. DENMAN,
W. P. VAUGHAN.